United States Patent
Caldwell et al.

(10) Patent No.: US 9,247,072 B2
(45) Date of Patent: Jan. 26, 2016

(54) PROCESSING COMMUNICATION STATUS INFORMATION

(71) Applicant: Metaswitch Networks Ltd., Enfield (GB)

(72) Inventors: Andrew Caldwell, London (GB); Michael Jeffrey Evans, High Wycombe (GB); Martin Taylor, London (GB)

(73) Assignee: METASWITCH NETWORKS LTD, Enfield (GB)

( * ) Notice: Subject to any disclaimer, the term of this patent is extended or adjusted under 35 U.S.C. 154(b) by 0 days.

(21) Appl. No.: 14/266,731

(22) Filed: Apr. 30, 2014

(65) Prior Publication Data

US 2014/0323083 A1 Oct. 30, 2014

Related U.S. Application Data

(63) Continuation-in-part of application No. 14/166,819, filed on Jan. 28, 2014.

(30) Foreign Application Priority Data

| Apr. 30, 2013 | (GB) | .................................... 1307811.8 |
| May 3, 2013 | (GB) | .................................... 1308078.3 |
| May 3, 2013 | (GB) | .................................... 1308080.9 |
| Jan. 17, 2014 | (GB) | .................................... 1400841.1 |

(51) Int. Cl.
*H04M 11/00* (2006.01)
*H04M 15/00* (2006.01)

(52) U.S. Cl.
CPC .............. *H04M 15/41* (2013.01); *H04M 15/57* (2013.01); *H04M 15/62* (2013.01); *H04M 15/83* (2013.01); *H04M 15/852* (2013.01); *H04M 15/88* (2013.01)

(58) Field of Classification Search
CPC ...................... H04M 15/41; H04M 2215/0164; H04M 15/88; H04M 15/83; H04M 15/62; H04M 15/57; H04M 15/852
See application file for complete search history.

(56) References Cited

U.S. PATENT DOCUMENTS 6,262,992 B1 * 7/2001 Nelson et al. .................. 370/426
6,359,976 B1 * 3/2002 Kalyanpur et al. ........... 379/134
(Continued)

FOREIGN PATENT DOCUMENTS

| EP | 2230818 A1 | 9/2010 |
| WO | 2008054647 A1 | 5/2008 |

(Continued)

OTHER PUBLICATIONS

3rd Generation Partnership Project; Technical Specification Group Services and Sytem Aspects; IP Multimedia Subsystem Aspects (IMS). Stage 2 (Release 5). Oct. 1, 2001.

*Primary Examiner* — Ajit Patel
(74) *Attorney, Agent, or Firm* — EIP US LLP

(57) ABSTRACT

Measures for processing communication status messages in a telecommunications network which includes a plurality of signaling nodes responsible for processing signaling information in the telecommunications network and a charging node responsible for processing billing information in the telecommunications network. A communication status message is received from a signaling node in the plurality. The received communication status message includes first communication status information. Second communication status information is generated on the basis of at least the first communication status information. One or more communication status messages are transmitted to the charging node. The one or more transmitted communication status messages include the first communication status information and the second communication status information.

36 Claims, 7 Drawing Sheets

(56) References Cited

U.S. PATENT DOCUMENTS

| | | | |
|---|---|---|---|
| 6,373,930 B1* | 4/2002 | McConnell et al. | 379/114.28 |
| 6,704,303 B1* | 3/2004 | Bowman-Amuah | 370/352 |
| 7,039,164 B1* | 5/2006 | Howe | 379/88.05 |
| 2006/0045251 A1* | 3/2006 | Liu et al. | 379/127.01 |
| 2006/0136557 A1 | 6/2006 | Schaedler et al. | |
| 2006/0149812 A1 | 7/2006 | Lin et al. | |
| 2008/0155659 A1 | 6/2008 | Gazier et al. | |
| 2008/0240084 A1 | 10/2008 | Tsukiashi et al. | |
| 2008/0256083 A1 | 10/2008 | Wakefield | |
| 2009/0319641 A1 | 12/2009 | Verbandt et al. | |
| 2010/0184403 A1 | 7/2010 | Cai et al. | |
| 2011/0103371 A1* | 5/2011 | Russell et al. | 370/352 |
| 2011/0113141 A1* | 5/2011 | Veenstra et al. | 709/226 |
| 2011/0188397 A1* | 8/2011 | McCann et al. | 370/252 |
| 2012/0092997 A1 | 4/2012 | Mihaly et al. | |
| 2013/0100863 A1* | 4/2013 | Guerra et al. | 370/259 |

FOREIGN PATENT DOCUMENTS

| | | |
|---|---|---|
| WO | 2009124594 A1 | 10/2009 |
| WO | 2011106690 A2 | 9/2011 |
| WO | 2011146844 A1 | 11/2011 |
| WO | 2012149966 A1 | 11/2012 |

* cited by examiner

PROCESSING COMMUNICATION STATUS INFORMATION

CROSS-REFERENCE TO RELATED APPLICATIONS

This application claims priority under 35 U.S.C. §119(a) to each of GB Patent Application No. 1307811.8, filed Apr. 30, 2013, GB Patent Application No. 1308080.9, filed May 3, 2013, GB Patent Application No. 1308078.3, filed May 3, 2013, and GB Patent Application No. 1400841.1, filed Jan. 17, 2014. This application is also a continuation-in-part of U.S. patent application Ser. No. 14/166,819, filed on Jan. 28, 2014, which claims priority under 35 U.S.C. §119(a) to each of GB Patent Application No. 1307811.8, filed Apr. 30, 2013, GB Patent Application No. 1308080.9, filed May 3, 2013, GB Patent Application No. 1308078.3, filed May 3, 2013, and GB Patent Application No. 1400841.1, filed Jan. 17, 2014. Each of the above-referenced patent applications is hereby incorporated by reference in its entirety.

BACKGROUND OF THE INVENTION

1. Field of the Invention

The present disclosure relates to processing communication data. In particular, but not exclusively, the present disclosure relates to processing communication status information in a telecommunications network.

2. Description of the Related Technology

In telecommunications networks, communications sessions, such as voice calls and video calls, may be established between endpoints via the network. Such endpoints may for example include mobile telephones, fixed line telephones and personal computers. Additionally, event based services, such as registration, messaging and presence services may also be provided. In order to ensure that such communication sessions and event based services are billed accurately, a telecommunications network typically includes a charging node responsible for monitoring the establishment and duration of communication sessions and the occurrence of event based services. Communication sessions are typically billed according to session based billing, in which the start and end of the session are reported to the charging node, with interim messages being reported periodically to confirm that the session is still ongoing. In contrast, event based services are typically billed according to event billing, in which event messages are reported to the charging node upon occurrence of the event.

Internet Protocol (IP) telephony networks, such as those conforming to the IP Multimedia Subsystem (IMS) are currently experiencing an increase in prevalence. In such networks, telephony services are typically provided according to the Session Initiation Protocol (SIP). An IP telephony network may contain a number of signaling nodes which are each responsible for carrying out one or more signaling functions in the network, such as conducting registration procedures, handling routing requests and/or handling service requests. In the case of IMS, a signaling node may fulfil the role of a Call Session Control Function (CSCF). In the context of SIP, such a signaling node may fulfil the role of a SIP server and/or a SIP proxy.

Signaling nodes may therefore maintain state information (for example routing data, authentication data etc.) for each subscriber that they serve. For relatively small numbers of subscribers, it may be practical for each signaling node to maintain state information for every subscriber. However, for large numbers of subscribers, the memory and associated processing requirements for storing state information for every subscriber at each signaling node and the requirement for replicating the state information between all signaling nodes in the network can become prohibitive.

In order to cater for a larger number of subscribers, known sharding techniques can be employed in IMS networks. Sharding involves allocating a longstanding responsibility for a subset of the subscribers in the telecommunications network to each signaling node in the network. Each signaling node therefore need only maintain state information for its allocated subset of subscribers. In a typical example, when a subscriber device registers with the network, it may be allocated to a signaling node, such as a Serving CSCF (S-CSCF) in the case of IMS, which is thereafter responsible for handling signaling information and maintaining the appropriate state information for that subscriber until such time as the device unregisters from the network. Similarly, a number of further signaling nodes may be utilized when a communication session is established to handle set up of that communication session as well as maintenance of the established communication session thereafter. A number of these further signaling nodes are included in the signaling path for signaling messages relating to that communication session for the duration of the communication session. In the case of IMS, these further signaling nodes may include one or more further CSCFs, for example including Interrogating CSCFs (I-CSCFs), Proxy CSCFs (P-CSCFs) and further S-CSCFs, as well as Border Gateway Control Functions (BGCFs), Interconnection Border Control Functions (IBCFs), Media Gateway Control Functions (MGCFs) etc.

However, this sharding approach suffers from increased routing complexity because any signaling messages (for example, in relation to establishment of a communication session) relating to a given subscriber that are handled after the initial registration must be routed via the appropriate, sharded network node. Further, the complexity of providing redundancy between sharded network nodes in order to handle failure of an individual network node in the network is increased. Hence, it would be desirable to provide improved and/or alternative techniques for handling potentially large numbers of subscribers and/or providing the required network scalability to do so, whilst providing measures which enable charging of communication sessions which are compatible with such techniques.

SUMMARY

According to a first embodiment, there is a method for processing communication status messages in a telecommunications network, the network including a plurality of signaling nodes responsible for processing signaling information in the telecommunications network, and a charging node responsible for processing billing information in the telecommunications network, the method comprising: receiving a communication status message from a signaling node in the plurality, the received communication status message comprising first communication status information; generating second communication status information on the basis of at least the first communication status information; and transmitting one or more communication status messages to the charging node, wherein the one or more transmitted communication status messages comprise the first communication status information and the second communication status information.

According to a second embodiment, there is apparatus for processing communication status messages in a telecommunications network, the network including a plurality of signaling nodes responsible for processing signaling information in the telecommunications network, and a charging node responsible for processing billing information in the telecommunications network, the apparatus comprising at least one processor, and at least one memory including computer program code, the at least one memory and the computer program code being configured to, with the at least one processor, cause the apparatus at least to: receive a communication status message from a signaling node in the plurality, the received communication status message comprising first communication status information; generate second communication status information on the basis of at least the first communication status information; and transmit one or more communication status messages to the charging node, wherein the one or more transmitted communication status messages comprise the first communication status information and the second communication status information.

Embodiments comprise a computer program product comprising a non-transitory computer-readable storage medium having computer readable instructions stored thereon, the computer readable instructions being executable by a computerized device to cause the computerized device to perform the method of the first embodiments.

Further features of embodiments will become apparent from the following description of preferred embodiments, given by way of example only, which is made with reference to the accompanying drawings.

DETAILED DESCRIPTION OF CERTAIN INVENTIVE EMBODIMENTS

Figure 1:
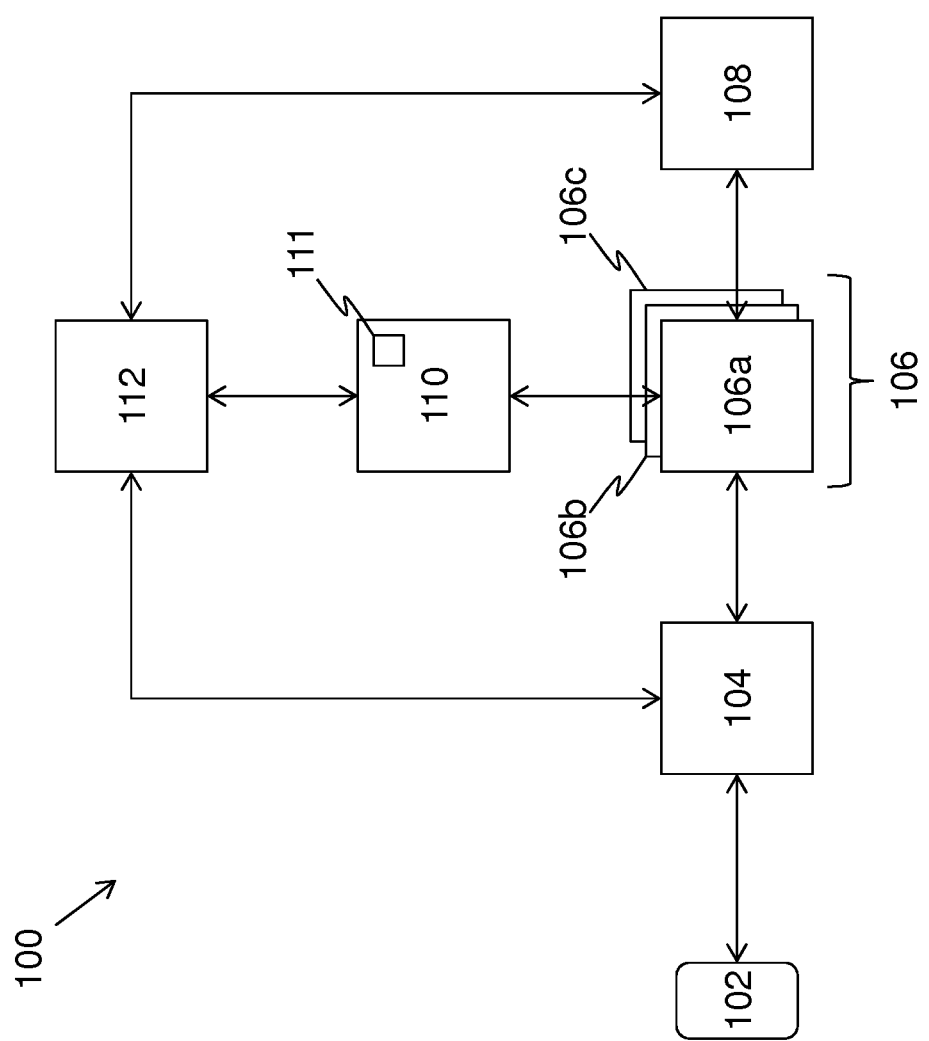
FIG. 1 illustrates an example telecommunications network in which one or more embodiments of the present disclosure may be practiced.

In embodiments, a system is proposed in which one or more signaling functions in the network are carried out by a plurality of signaling nodes. In the proposed system, each signaling node in the plurality is provided with access to a shared data store for storing state information associated with subscribers and/or communications in the network. Such a proposed system does not require a longstanding assignment of a given subscriber to a given signaling node as any signaling node amongst the plurality is enabled to process signaling messages relating to any given subscriber. In this manner, the plurality of signaling nodes may be referred to as a cluster.

In such a proposed system, processing of a signaling message may be allocated to one of the clustered signaling nodes. The allocated signaling node is configured to process the signaling message and read and/or write state information to/from the shared data store. Having processed the signaling message, there is no requirement for the given signaling node to remain in a signaling path, as any subsequent signaling messages can be allocated to any node in the cluster for processing. This proposed system provides improved resilience to failure of a given signaling node in the network, as the lack of a longstanding assignment to a specific signaling node means that other signaling nodes in the cluster can process subsequent signaling messages. Additionally, scaling of the network to handle larger subscriber numbers can be achieved by adding additional signaling nodes to the cluster, without requiring extensive reconfiguration of the telecommunications network. In the context of IMS, the absence of a longstanding relationship between subscribers and specific signaling nodes in the proposed system also removes the requirement for an Interrogating CSCF (I-CSCF) to be provided in the network. This is because signaling messages for a given subscriber or communication session can be allocated to any signaling node in the cluster.

The deviations from expected network behavior which the proposed system employs introduce certain complexities in relation to charging for services provided in the telecommunications network. For billing purposes, a charging node is typically deployed in a telecommunications network to receive communication status messages from signaling nodes in the telecommunications network in order to monitor the establishment and duration of communication sessions, or the occurrence of event based services. In the case of IMS, such a charging entity may comprise a Charging Data Function (CDF). A charging node may typically expect to receive communication status messages from all of the signaling nodes which would be in the signaling path in a conventional network topology. In the proposed system, the requirement for some such signaling nodes to remain in the signaling path, or indeed to be provided in the network at all, is removed. Therefore the signaling nodes of the proposed system may not always be capable of providing the expected set of communication status messages to a charging node.

In order to ensure co-operation between such a proposed system and a charging node configured in such a manner, the present disclosure provides a network node in the telecommunications network which is configured to receive communication status messages from one or more signaling nodes in the network, and transmit communication status messages to a charging node in the network. This network node is configured to ensure that a complete set of communication status messages are provided to the charging node, as would be the case in a conventional telecommunications network topology. However, the network node may be deployed in systems other than the proposed system outlined above, and its operation is not limited to the context of such a proposed system, as will be appreciated from the following description of various embodiments. Communication status messages may relate to a communication session and/or an event based service in the telecommunications network.

FIG. 1 illustrates an example telecommunications network 100 in which embodiments of the present disclosure may be practiced. Telecommunications network 100 comprises a plurality of signaling nodes 106, which are collectively responsible for processing signaling messages in telecommunications network 100. In embodiments, the plurality of signaling nodes 106 are collectively responsible for conducting registration procedures for subscriber devices and/or processing routing data relating to communication sessions conducted in telecommunications network 100. In this manner, the plurality of signaling nodes 106 may be referred to as a cluster of signaling nodes. The cluster of signaling nodes 106 may comprise nodes performing the functions of one or more CSCFs, SIP Routers, SIP Registrars, SIP Service Nodes, SIP Proxies, etc. In the embodiments depicted in FIG. 1, the cluster of signaling nodes 106 comprise nodes performing the functions of an IMS S-CSCF, and are responsible for SIP routing and/or registration functions. In FIG. 1, the plurality of signaling nodes 106 is depicted as comprising three signaling nodes 106a, 106b and 106c. In practice, the plurality of signaling nodes 106 may comprise further signaling nodes (not shown), or fewer than the three depicted signaling nodes.

Telecommunication network 100 also comprises a number of further signaling nodes, including edge proxy 104 and border entity 108. Subscriber device 102 is configured to communicate via telecommunications network 100. Subscriber device 102 communicates with telecommunications network 100 via edge proxy node 104. In the context of IMS, edge proxy node 104 may perform the functions of a Proxy CSCF (P-CSCF). In embodiments, edge proxy 104 may comprise a Session Border Controller (SBC). The communication link between subscriber device 102 and edge proxy node 104 may further comprise one or more intermediate entities, such as wireless access points, routing devices, gateway entities, etc. Edge proxy node 104 may be further responsible for interfacing between telecommunications network 100 and one or more further subscriber devices (not shown). Telecommunications network 100 may also comprise one or more further edge proxy nodes (not shown), each responsible for interfacing between telecommunications network 100 and a number of yet further subscriber devices (not shown). For example, each further edge proxy node may provide access to telecommunications network 100 for subscriber devices in different geographic locations. In some embodiments, one or more of the further edge proxy nodes may be located in a further telecommunications network (not shown). In embodiments, the further telecommunications network may comprise an IMS network.

In embodiments, the signaling nodes in the plurality of signaling nodes 106 are each configured to access a shared registration data store (not shown) for reading and writing registration data relating to subscribers in telecommunications network 100. The shared registration data store comprises registration data for a plurality of subscriber devices registered with telecommunications network 100, including subscriber device 102, and is accessible by each of the plurality of signaling nodes in cluster 106. In embodiments, the plurality of signaling nodes in cluster 106 are also configured to communicate with one or more further entities within telecommunications network 100, such as border entity 108, and/or with one or more entities outside of telecommunications network 100 (i.e. entities in different telecommunications networks; not shown) via border entity 108. In the context of IMS, border entity 108 may, for example, comprise one or more of Border Control Gateway Function (BGCF), a Media Gateway Control Function (MGCF), Interconnection Border Control Function (IBCF) or a further P-CSCF. In some embodiments, border entity 108 comprises a Session Border Controller (SBC). In some embodiments, border entity 108 comprises an Application Server (AS).

Telecommunications network 100 further comprises network node 110, which is configured to receive communication status messages from signaling nodes in the cluster of signaling nodes 106. The communication status messages comprise communication status information associated with a given communication session or event based service handled by the signaling node from which the message was received. In the case of IMS, a communication status message may comprise an Accounting Request (ACR). In particular, an IMS communication status message may comprise a START, EVENT, INTERIM or STOP message. In the case of a communication session, the communication status information may comprise a partial call record. A partial call record may refer to an incomplete set of communication status information, which if complete would form a complete call record. In the context of IMS, a complete call record may comprise a Call Detail Record (CDR). The communication link between the cluster of signaling nodes 106 and network node 110 may further comprise one or more intermediate entities (not shown). In some embodiments, network node 110 may be further configured to receive communication status messages from one or more further signaling nodes in the network, such as edge proxy 104 and/or border entity 108. In some embodiments, the communication status messages received at network node 110 from signaling nodes in telecommunications network, such as signaling nodes 106, edge proxy 104 and/or border entity 108 are received via the Hypertext Transport Protocol (HTTP).

Network node 110 is further configured to transmit communication status messages to charging node 112. In some embodiments, the communication status messages sent to charging node 112 by network node 110 are transmitted according to the DIAMETER protocol. In embodiments, network node 110 determines the location of charging node 112 in telecommunications network 100 on the basis of information received in one or more communication status messages transmitted by a signaling node in the plurality of signaling nodes 106. In alternative embodiments, network node 110 is pre-configured with knowledge of the location of charging node 112. Charging node 112 is responsible for processing billing information in telecommunications network 100. In embodiments, charging node 112 may comprise an IMS Charging Data Function (CDF). In such embodiments, the communication link between network node 110 and charging node 112 may comprise an IMS Rf interface. The communication link between network node 110 and charging node 112 may further comprise one or more intermediate entities (not shown). In the embodiments depicted in FIG. 1, charging node 112 is further configured to receive communication status messages from further nodes in the network, including edge proxy node 104 and/or border entity 108.

On the basis of the received communication status messages, network node 110 is configured to generate one or more further communication status messages and transmit the one or more generated communication status messages to charging node 112. In some embodiments, network node 110 is configured to forward one or more communication status messages received from the cluster of signaling nodes 106, and/or one or more further signaling nodes in the network, on to charging node 112. In some such embodiments, the received communication status messages are modified prior to forwarding on to charging node 112. For example, communication status information comprised within a communication status message may be received in one format from a signaling node in telecommunications network 100, but transmitted to charging node 112 in a second, different format. In some embodiments, a communication status message is received from a signaling node in telecommunications network 100 in JavaScript Object Notation (JSON) via HTTP, but transmitted to charging node 112 via the DIAMETER protocol, for example. In some embodiments, the generated communication status messages may be transmitted in place of one or more of the received communication status messages. In some embodiments, the generated communication status messages are transmitted in addition to one or more of the received communication status messages. That is to say, in various embodiments, the communication status messages transmitted by network node 110 may include none, some, or all of the communication status messages received by network node 110, in addition to any communication status messages generated by network node 110. The operation of network node 110 is illustrated further in relation to the following figures. In some embodiments, telecommunications network 100 comprises an IMS network.

Figure 2:
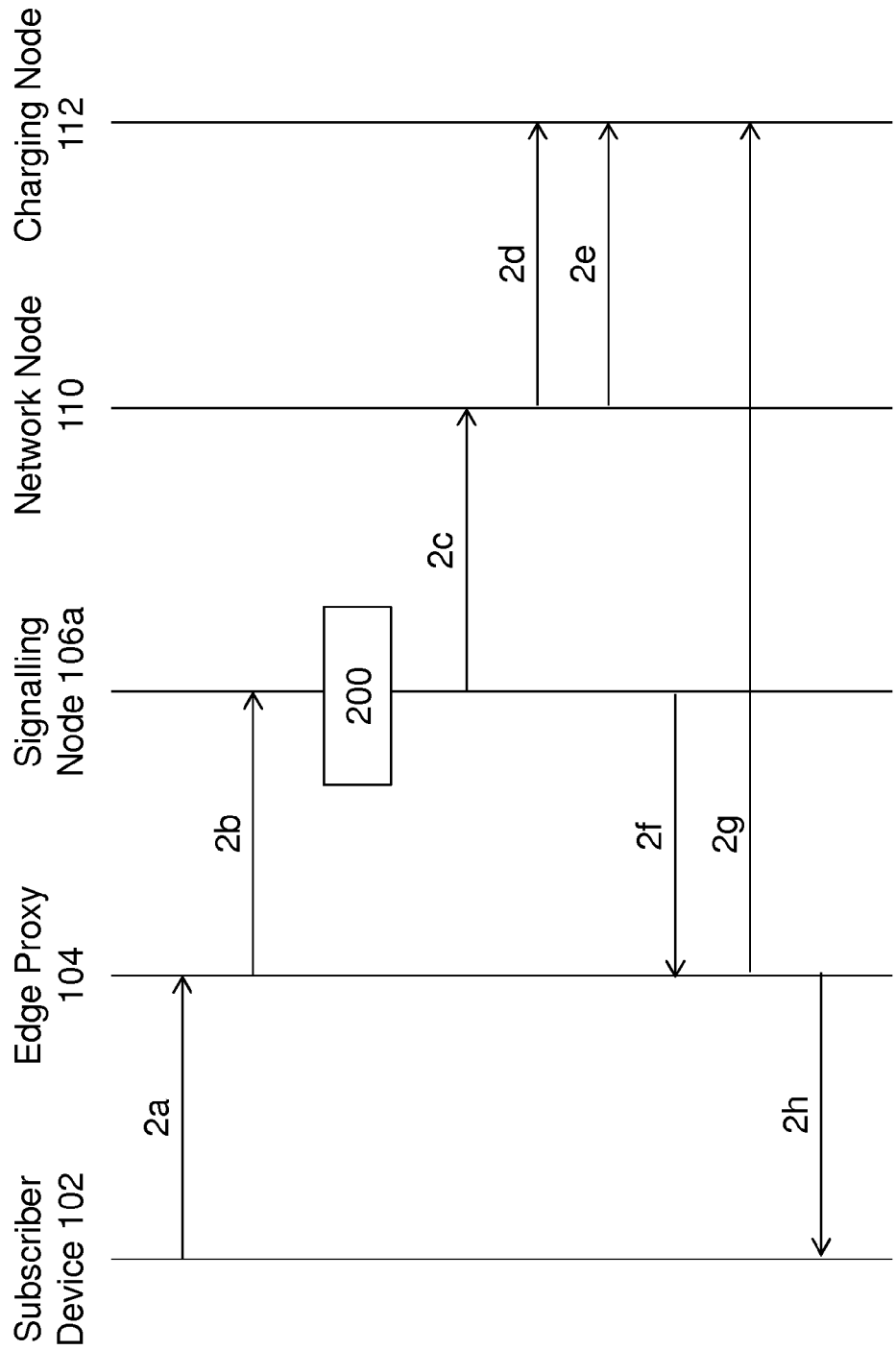
FIG. 2 illustrates an example communication status reporting procedure according to one or more embodiments of the present disclosure

FIG. 2 illustrates an example communication status reporting procedure for an event based service according to embodiments. In the embodiments depicted in FIG. 2, edge proxy 104 is configured to report communication status messages to charging node 112 directly. Network node 110 has therefore been configured according to embodiments to ensure that charging node 112 receives the communication status messages that would conventionally be provided by nodes in telecommunications network other than edge proxy 104. In the context of IMS, for an event based service, a CDF may expect to receive an EVENT message from an S-CSCF and an EVENT message from a P-CSCF for each event based service provided in telecommunications network 100. For some event based services, such as a REGISTER service, a CDF may also expect to receive an EVENT message from an I-CSCF. In some embodiments, edge proxy 104 fulfils the role of a P-CSCF in telecommunications network 100. In such embodiments, edge proxy 104 is configured to report EVENT messages for event based services to charging node 112 directly. Hence, network node 110 may be configured to report one or more EVENT messages on behalf of an S-CSCF or I-CSCF to charging node 112.

A service request message 2a for an event based service is initially sent from subscriber device 102 to edge proxy node 104. In the case of SIP, service request message 2a may, for example, comprise a SIP REGISTER, MESSAGE or PUBLISH request. Transmission of service request message 2a may be preceded by establishment (not shown) of a communication channel, for example via the Transmission Control Protocol (TCP), the User Datagram Protocol (UDP) or Websocket, between subscriber device 102 and edge proxy 104.

In response to receipt of service request message 2a, edge proxy 104 may allocate the registration request to one of the plurality of signaling nodes 106, in this case signaling node 106a. In some embodiments, the choice of signaling node is made randomly by edge proxy 104. In further embodiments, the choice of signaling node is made according to one or more load balancing criteria in order to distribute network load across the plurality of signaling nodes in the cluster 106. In embodiments, the one or more load balancing criteria allow a service request message to be handled by any of the plurality of signaling nodes in the cluster 106. In alternative embodiments, a subscriber may be allocated to a particular signaling node in cluster 106 during a prior registration procedure, after which subsequent messages relating to the same subscriber are allocated to the same signaling node. The service request message is then forwarded to the allocated signaling node 106a as registration request message 2b. In response to receipt of service request message 2b, signaling node 106a is configured to process the received service request message at step 200, which may comprise forwarding the service request message on to a further node in telecommunications network 100 and receiving a corresponding service response message, and/or reading or writing data from the shared data store.

Having processed service request message 2b at step 200, allocated signaling node 106a is configured to transmit a communication status message 2c to network node 110. In embodiments in which processing 200 comprises forwarding the service request message and receiving a corresponding service response message, communication status message 2c may be transmitted in response to receipt of the service response message in order to ensure that the service is not billed until the response has been generated. In embodiments, communication status message 2c comprises communication status information. The communication status information may for example comprise an indication of the type of service that was requested (e.g. a REGISTER, MESSAGE or PUBLISH etc.). In embodiments the communication status information may comprise an identifier for the specific instance of event based service, so that multiple communication status messages or items of communication status information which relate to the same event based service instance can later be correlated. In the context of IMS, the communication status information may for example indicate that communication status message 2c is an EVENT message. In some embodiments, communication status message 2c further comprises an originating node type identifier. An originating node type identifier may identify a type of node from which the communication status message was received, or a type of function fulfilled by the node from which the communication status message was received. In the context of FIG. 2, the originating node type identifier of communication status message 2c is associated with allocated signaling node 106a. In the IMS example described above, the originating node type identifier may for example identify that allocated signaling node 106a performs the function of an S-CSCF, and therefore that that EVENT message 2c is associated with an S-SCSF instance.

Having received communication status message 2c, network node 110 is configured to generate any further communication status information that may be required for reporting to charging node 112. In the context of IMS for example, if the event based service requested by subscriber device 102 in service request message 2a was a registration service, then charging node 102 (fulfilling the role of a CDF) will expect to receive an EVENT message associated with an I-CSCF instance, in addition to the EVENT message generated by signaling node 106a (fulfilling the role of an S-CSCF). Therefore, network node 110 is configured to generate further communication status information on the basis of received communication status message 2c, and transmit the generated communication status information to charging node 112 in communication status message 2d. In embodiments, communication status message 2d is transmitted in response to receipt of communication status message 2c. In embodiments, the further communication status information is generated on the basis of the communication status information received in communication status message 2c. For example, an identifier for the specific event based service instance comprised within the received communication status information may be included in the generated communication status information, to ensure that communication status message 2d, and/or the communication status information comprised therein can be later correlated with other communication status messages/information relating to the same specific event based service instance.

In the context of IMS, communication status message 2d may for example comprise an EVENT message comprising communication status information generated on the basis of the communication status information received in EVENT message 2c. For example, network node 110 may be configured to generate communication status information which identifies communication status message 2*d* as an EVENT message on the basis of the communication status information received in communication status message 2*c* having identified communication status message 2*c* as an EVENT message. Further components of the communication status information received in communication status message 2*c*, such as an indication of the type of service requested and/or an identifier for the specific event based service instance may also be used when generating the generated communication status information.

In embodiments, an originating node type identifier for communication status message 2*d* is generated by network node 110. In some embodiments, the originating node type identifier generated for communication status message 2*d* is different to the originating node type identifier comprised within received communication status message 2*c*. For example, in the context of the IMS scenario described above, an originating node type identifier may be generated for communication status message 2*d* which is associated with an I-CSCF function. In networks which do not deploy an I-CSCF function, this enables the expected set of communication status messages to be generated and transmitted as expected to charging node 112. Therefore, in some embodiments, the generated originating node type identifier is not associated with a signaling node in telecommunications network 100.

In addition to transmitting the generated communication status information to charging node 112 in communication status message 2*d*, network node 110 may be further configured to transmit the communication status information received in communication status message 2*c* on to charging node 112 in communication status message 2*e*. In the context of the IMS example described above, communication status message 2*e* may for example comprise an EVENT message with an originating node type identifier associated with an S-CSCF instance.

Having processed service request message 2*b* at step 200, allocated signaling node 106*a* is further configured to transmit a service response message 2*f* to edge proxy 104. In embodiments, the service response message is generated by allocated signaling node 106*a*. In further embodiments, for example where the processing of service request message 2*b* at step 200 comprises transmitting the service request message to a further network node, the service response message may be received at allocated signaling node 106*a* from a further network node, and forwarded to edge proxy 104 as service response message 2*f*.

In response to receipt of service response message 2*f*, edge proxy 104 is configured to transmit communication status message 2*g* to charging node 112. In the context of IMS, communication status message 2*g* may for example comprise an EVENT message. In embodiments, communication status message 2*g* comprises communication status information. As described above, communication status information may comprise an indication of the type of service that was requested and/or comprise an identifier for the specific instance of event based service. In the context of IMS, the communication status information may for example indicate that communication status message 2*g* is an EVENT message. In some embodiments, communication status message 2*g* further comprises an originating node type identifier associated with edge proxy 104. In the IMS example described above, the originating node type identifier may for example identify that edge proxy 104 performs the function of a P-CSCF, and therefore that that EVENT message 2*g* is associated with a P-CSCF instance. In response to receipt of service response message 2*f*, edge proxy 104 is further configured to transmit service response message 2*h* to subscriber device 102.

Hence, in embodiments, the operation of network node 110 in the context of the proposed telecommunications network 100 serves to ensure that charging node 112 receives a complete set of communication status messages associated with the event based service provided. In the context of the IMS example described above, this includes an EVENT message associated with an I-CSCF instance, an EVENT message associated with a P-CSCF instance and an EVENT message associated with an S-CSCF instance. In some embodiments, the generated communication status information transmitted in communication status message 2*d* may only be required for a subset of the event based services provided in telecommunications network 100. In the context of IMS for example, network node 110 may be configured to transmit the generated communication status information only if the requested event based service is a registration service. In such embodiments, network node 110 may be configured to inspect the communication status information comprised within received communication status messages, in order to determine the type of service to which the communication status message relates. In such embodiments, the further communication status information is conditionally generated on the basis of the received status information. For example, the further communication status information may only be generated if communication status message relates to a predetermined type of service (such as for example a registration). In such embodiments, communication status message 2*d* is conditionally transmitted on the basis of the communication status information comprised within received communication status message 2*c*. In such embodiments, if communication status message 2*d* is not required for reporting a given event based service, then the only communication status messages transmitted to charging node 112 are the forwarded communication status message 2*e* and communication status message 2*g*.

Figure 3:
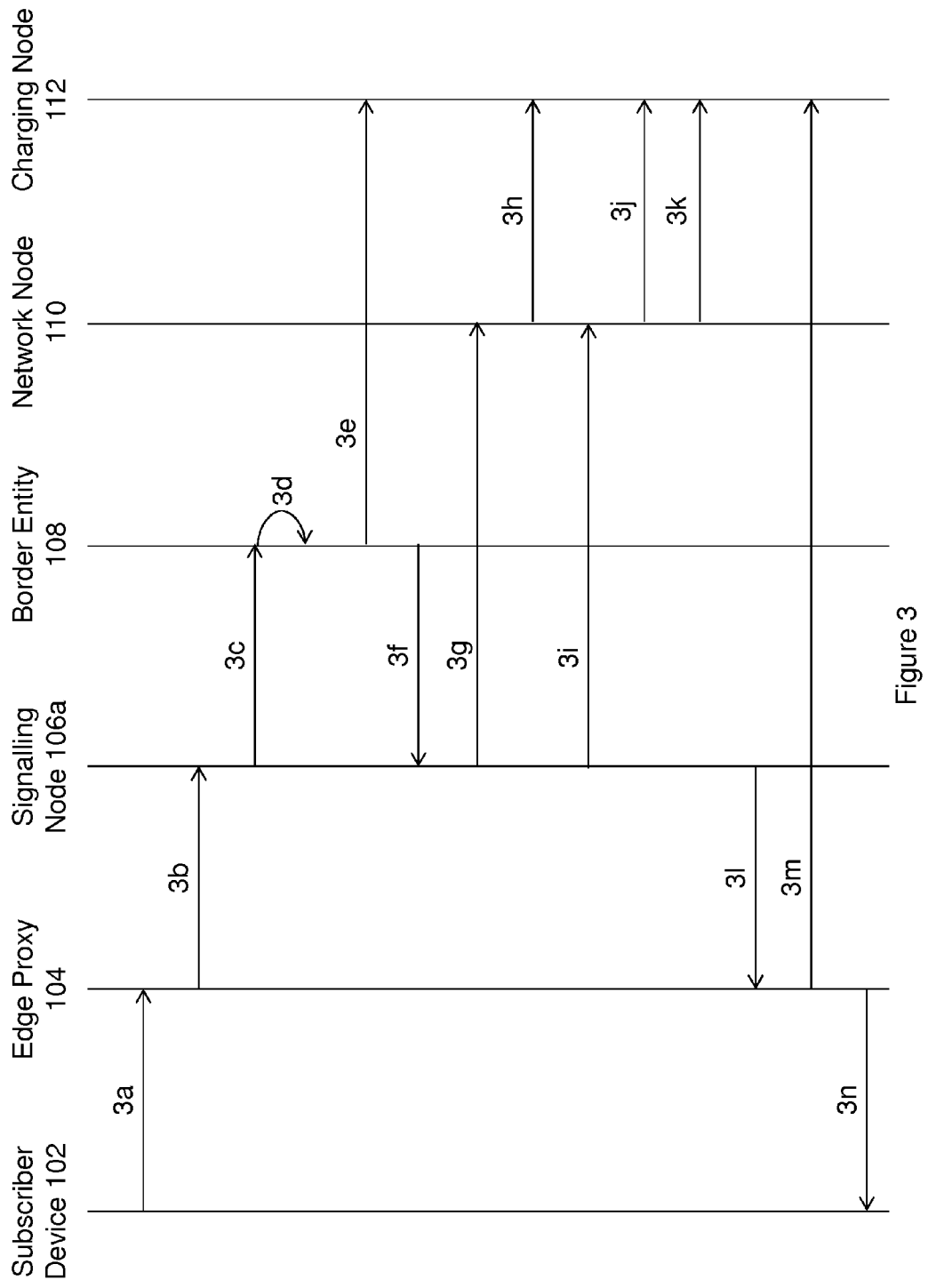
FIG. 3 illustrates an example communication status reporting procedure according to one or more embodiments of the present disclosure.

FIG. 3 illustrates an example communication status reporting procedure for a communication session setup process according to embodiments. In the embodiments depicted in FIG. 3, edge proxy 104 and border entity 108 are configured to report communication status messages to charging node 112 directly. In such embodiments, network node 110 is therefore configured to ensure that charging node 112 receives the communication status messages that would be conventionally provided by nodes in telecommunications network other than edge proxy 104 and border entity 108. In the context of IMS, for a communication session setup process, a CDF may expect to receive a START message from each of an originating P-CSCF, an originating S-CSCF, a terminating S-CSCF and a terminating P-CSCF, as well as an EVENT message from an I-CSCF. In some embodiments, edge proxy 104 and border entity 108 fulfil the role of P-CSCFs in telecommunications network 100. In some such embodiments, edge proxy 104 and border entity 108 are configured to report START messages for setup of a communication session to charging node 112 directly. Hence, in such embodiments, network node 110 may be configured to report one or more START messages and/or EVENT messages on behalf of S-CSCF or I-CSCF instances to charging node 112.

A service request message 3*a* is initially sent from subscriber device 102 to edge proxy node 104, which requests setup of a communication session in telecommunications network 100. In embodiments, service request message 3*a* comprises a communication session setup request message. In the context of SIP, service request message 3*a* may comprise a SIP INVITE message. Transmission of service request message 3a may be preceded by an earlier registration process performed by subscriber device 102, for example as described in relation to FIG. 2. In response to receipt of service request message 3a, edge proxy 104 may allocate the service request to one of the plurality of signaling nodes 106, in this case signaling node 106a. The choice of signaling node may for example be made randomly by edge proxy 104, or according to one or more load balancing criteria. The service request message is then forwarded to the allocated signaling node 106a as service request message 3b. In response to receipt of service request message 3b, signaling node 106a is configured to forward the received service request message to border entity 102 as service request message 3c. Prior to transmitting service request message 3c, signaling node 106a may be configured to read and/or write data from and/or to the shared data store respectively, for example to determine how to route service request message 3c.

In response to receipt of service request 3c message, border entity 108 is configured to process the service request. In some embodiments, the processing of the service request comprises transmitting the service request to a further node, such as the subscriber device with which a communication session is to be established (not shown), and receiving a corresponding service response message, as illustrated by step 3d in FIG. 3. In embodiments, the service request and corresponding service response may be sent to and received from the further node via one or more intermediate entities, such as gateway entities. In embodiments, the service response message may comprise a SIP 200 OK message. In some embodiments, service request 3c may be processed by border entity 108, without requiring the service request message to be forwarded to a further node, for example if the communication session is to be established with a voicemail server. In such embodiments, border entity 108 may comprise an application server, capable of hosting a voicemail application.

In response to processing the service request at step 3d, border entity 108 is configured to transmit communication status message 3e to charging node 112. In the context of IMS, communication status message 3e may comprise a START message. In embodiments, communication status message 3e comprises communication status information. The communication status information may comprise an indication of the type of service that was requested. In the embodiments depicted in FIG. 3, the communication status information may indicate that setup of a communication session was requested, and may also specify the type of communication session that was requested (e.g. voice call, video call, high definition voice call, etc.). In embodiments, the communication status information may also comprise an identifier for the specific communication session, so that multiple communication status messages or items of communication status information which relate to the same communication session can later be correlated. In the context of IMS, the communication status information may for example indicate that communication status message 3e is a START message. In some embodiments, communication status message 3e further comprises an originating node type identifier. In the context of FIG. 3, the originating node type identifier of communication stats message 3e is associated with border entity 108. In the IMS example described above, the originating node type identifier may identify that border entity 108 performs the function of a P-CSCF, and therefore that that START message 3e is associated with a P-CSCF instance. In response to processing the service request at step 3d, border entity 108 is further configured to transmit service response message 3f to allocated signaling node 106a.

In response to receipt of service response message 3f, allocated signaling node 106a is configured to transmit one or more communication status messages to network node 110. In embodiments, the number of communication status messages transmitted to network node 110 by signaling node 106a depends upon whether the called party's device (i.e. the device to which the communication session setup request is directed), as well as subscriber device 102 are served by telecommunications network 100. In the embodiments depicted in FIG. 3, the plurality of signaling nodes 106 provide services to both subscriber device 102 and the called party's device, and hence two communication status messages are sent to network node 110. In alternative embodiments, the plurality of signaling nodes 106 provide services to only one of subscriber device 102 and the called party's device, and hence only one communication status message is transmitted in response to receipt of service response message 3f. In the case of IMS, in some embodiments where subscriber device 102 and the called party's device are located in different networks, charging node 112 may also expect to receive two EVENT messages from I-CSCF instances during a communication session setup process. However, in such embodiments, the second I-CSCF EVENT message, as well as the second S-CSCF and the second P-CSCF will be generated by the responsible entities in the called party's network.

Communication status message 3g is transmitted by allocated signaling node 106a in its capacity as serving the called party's device. In embodiments, communication status message 3g comprises a served party indicator, which identifies whether the originating node that sent the communication status message (in this case signaling node 106a) was serving the called party or the calling party. In such embodiments, communication status message 3g comprises a served party indicator which identifies that the called party was being served. Communication status message 3i is transmitted by allocated signaling node 106a in its capacity as serving the subscriber device 102 (i.e. the calling party's device). In embodiments, communication status message 3i comprises a served party indicator, which identifies that the calling party was being served.

In the context of IMS, communication status messages 3g and 3i may for example comprise START messages. In embodiments, communication status messages 3g and 3i each comprise communication status information. The communication status information may comprise an indication of the type of service that was requested, and/or an identifier for the specific communication session. In the context of IMS, the communication status information may for example indicate that the communication status message is a START message. In some embodiments, communication status messages 3g and 3i further comprise an originating node type identifier, associated with allocated signaling node 106a. In the IMS example described above, the originating node type identifier may identify that allocated signaling node 106a performs the function of an S-CSCF, and therefore that the START message is associated with an S-CSCF instance.

In response to receipt of communication status message 3g, network node 110 identifies, on the basis of the communication status information comprised therein that the called party was being served by the originating node at the time the message was transmitted. In response to the identifying that communication status message 3g relates to a called party, network node 110 is configured to forward the communication status information comprised therein to charging node 112 in communication status message 3h.

In response to receipt of communication status message 3i, network node 110 identifies, on the basis of the communication status information comprised therein that the calling party (i.e. subscriber device 102) was being served by the originating node at the time the message was transmitted. In response to the identifying that communication status message 3i relates to a calling party, network node 110 is configured to generate any further communication status information that may be required for reporting to charging node 112. In the context of IMS for example, if the service requested by subscriber device 102 in service request message 3a was the setup of a communication session, then charging node 102 (fulfilling the role of a CDF) will expect to receive an EVENT message associated with an I-CSCF instance, in addition to the START message generated by signaling node 106a (fulfilling the role of an S-CSCF). Therefore, network node 110 is configured to generate further communication status information on the basis of at least received communication status message 3i, and transmit the generated communication status information to charging node 112 and in communication status message 3j. In embodiments, the further communication status information is generated on the basis of the communication status information received in communication status message 3i. For example, an identifier for the communication session comprised within the received communication status information may be included in the generated communication status information, to ensure that communication status message 3j, and/or the communication status information comprised therein can be later correlated with other communication status messages/information relating to the same communication session. In embodiments, the generated communication status information may be generated further on the basis of further communication status information received in one or more further communication status messages, such as communication status message 3g. In embodiments, communication status message 3j is transmitted in response to receipt of communication status message 3i.

In the context of IMS, communication status message 3j may for example comprise an EVENT message. In embodiments, an originating node type identifier for communication status message 3j is generated by network node 110. In some embodiments, the originating node type identifier generated for communication status message 3j is different to the originating node type identifier comprised within received communication status message 3i. For example, in the context of the IMS scenario described above, an originating node type identifier may be generated for communication status message 3j which is associated with an I-CSCF function. In networks which do not deploy an I-CSCF function, this enables the expected set of communication status messages to be generated, even if a non-conventional network topology is employed. Therefore, in some embodiments, the generated originating node type identifier is not associated with a signaling node in telecommunications network 100.

In embodiments, in addition to transmitting the generated communication status information to charging node 112 in communication status message 3j, network node 110 is further configured to transmit the communication status information received in communication status message 3i on to charging node 112 in communication status message 3k. In the context of the IMS example described above, communication status message 3k may comprise a START message with an originating node type identifier associated with an S-CSCF instance. Having transmitted communication status messages 3g and 3i to network node 110, allocated signaling node 106a is further configured to transmit service response message 3l to edge proxy 104.

In response to receipt of service response message 3l, edge proxy 104 is configured to transmit communication status message 3m to charging node 112. In the context of IMS, communication status message 3m may comprise a START message. In embodiments, communication status message 3m comprises communication status information. As described above, communication status information may comprise an indication of the type of service that was requested and/or comprise an identifier for the specific communication session. In the context of IMS, the communication status information may indicate that communication status message 3m is a START message. In some embodiments, communication status message 3m further comprises an originating node type identifier associated with edge proxy 104. In the IMS example described above, the originating node type identifier may identify that edge proxy 104 performs the function of a P-CSCF, and therefore that START message 3m is associated with a P-CSCF instance. In response to receipt of service response message 3m, edge proxy 104 is further configured to transmit service response message 3n to subscriber device 102.

Hence, in embodiments, the operation of network node 110 in the context of the proposed telecommunications network 100 serves to ensure that charging node 112 receives a complete set of communication status messages associated with set up of a communication session. In the context of the IMS example described above, this includes an EVENT message associated with an I-CSCF instance, two EVENT messages associated with S-CSCF instances and two EVENT messages associated with P-CSCF instances. In some embodiments, the generated communication status information transmitted in communication status message 3j may only be required for a subset of the event based services provided in telecommunications network 100. In the context of IMS for example, transmission of generated communication status information may only be required during setup of the communication session, but not during termination of the communication session, or during the interim period. In such embodiments, network node 110 may be configured to inspect the communication status information comprised within received communication status messages, in order to determine the type of service to which the communication status message relates. In such embodiments, the further communication status information is conditionally generated on the basis of the received status information. For example, the further communication status information may only be generated if the communication status message relates to a predetermined type of service (such as setup of a communication session). In such embodiments, communication status message 3j is conditionally transmitted on the basis of the communication status information comprised within received communication status messages. The operation of network node 110 in some such scenarios is described in further detail below.

Figure 4:
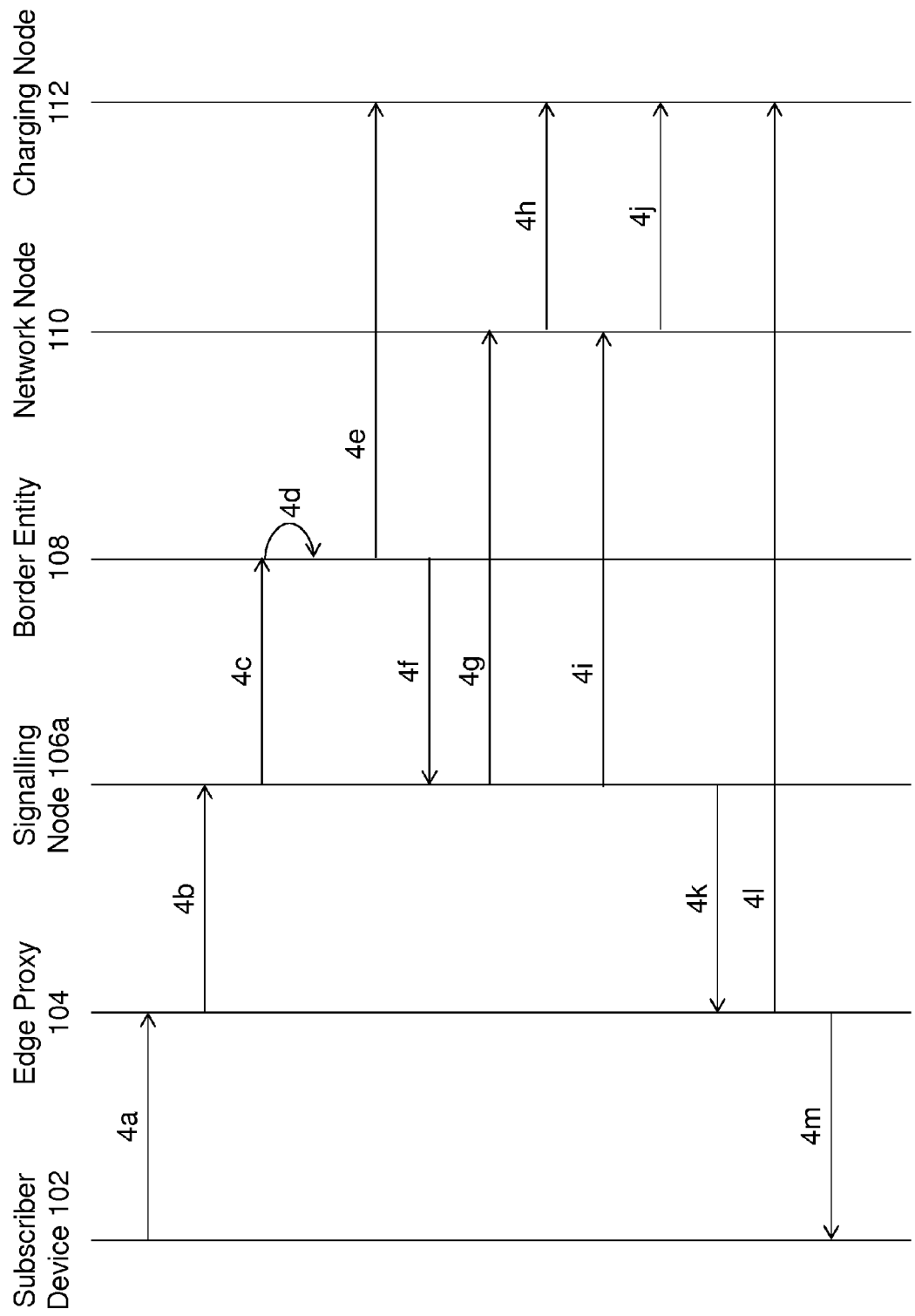
FIG. 4 illustrates an example communication status reporting procedure according to one or more embodiments of the present disclosure.

FIG. 4 illustrates an example communication status reporting procedure for a communication session termination process according to embodiments. In the embodiments depicted in FIG. 3, edge proxy 104 and border entity 108 are configured to report communication status messages to charging node 112 directly. Network node 110 has therefore been configured to ensure that charging node 112 receives the communication status messages that would be conventionally provided by nodes in telecommunications network other than edge proxy 104 and border entity 108. In the context of IMS, for a communication session termination process, a CDF may for example expect to receive a STOP message from each of an originating P-CSCF, an originating S-CSCF, a terminating S-CSCF and a terminating P-CSCF. In some IMS embodiments, edge proxy 104 and border entity 108 fulfil the role of P-CSCFs in telecommunications network 100. In some such embodiments, edge proxy 104 and border entity 108 are configured to report STOP messages for termination of a communication session to charging node 112 directly. Hence, in such embodiments, network node 110 may be configured to report one or more STOP messages to charging node 112 on behalf of S-CSCF instances.

A termination request message 4a is initially sent from subscriber device 102 to edge proxy node 104, which requests termination of a communication session in telecommunications network 100. In the context of SIP, termination request message 4a may for example comprise a SIP BYE message. Transmission of termination request message 4a may be preceded by an earlier communication session setup process, for example as described previously in relation to FIG. 3. In response to receipt of termination request message 4a, edge proxy 104 may allocate the termination request to one of the plurality of signaling nodes 106, in this case signaling node 106a. The choice of signaling node may be made randomly by edge proxy 104, or according to one or more load balancing criteria. The termination request message is then forwarded to the allocated signaling node 106a as termination request message 4b. In response to receipt of service request message 4b, signaling node 106a is configured to forward the received termination request message to border entity 108 as termination request message 4c. Prior to transmitting termination request message 4c, signaling node 106a may be configured to read and/or write data from and/or to the shared data store respectively, for example to determine how to route termination request message 4c.

In response to receipt of termination request message 4c, border entity 108 is configured to process the termination request. In embodiments, the processing of the termination request comprises transmitting the termination request to a further node, such as the subscriber device with which the communication session is presently established, and receiving a corresponding termination response message, as illustrated by step 4d in FIG. 4. In embodiments, the service response message may comprise a SIP 200 OK message.

In response to processing the termination request at step 4d, border entity 108 is configured to transmit communication status message 4e to charging node 112. In the context of IMS, communication status message 4e may comprise a STOP message. In embodiments, communication status message 4e comprises communication status information. The communication status information may comprise an indication of the type of service that was requested. In the embodiments depicted in FIG. 4, the communication status information may indicate that termination of a communication session was requested, and may also comprise an identifier for the specific communication session, so that multiple communication status messages or items of communication status information which relate to the same communication session can later be correlated. In the context of IMS, the communication status information may indicate that communication status message 4e is a STOP message. In some embodiments, communication status message 4e further comprises an originating node type identifier. In the context of FIG. 4, the originating node type identifier of communication stats message 4e is associated with border entity 108. In the IMS example described above, the originating node type identifier may identify that border entity 108 performs the function of a P-CSCF, and therefore that that STOP message 4e is associated with a P-CSCF instance. In response to processing the termination request at step 4d, border entity 108 is further configured to transmit termination response message 4f to allocated signaling node 106a.

In response to receipt of termination response message 4f, allocated signaling node 106a is configured to transmit one or more communication status messages to network node 110. The number of communication status messages transmitted to network node 110 by signaling node 106a depends upon whether the called party's device (i.e. the device with which the communication session is established), as well as subscriber device 102 are served by telecommunications network 100. In the embodiments depicted in FIG. 4, the plurality of signaling nodes 106 provide services to both subscriber device 102 and the called party's device, and hence two communication status messages are sent to network node 110. In alternative embodiments, the plurality of signaling nodes 106 provide services to only one of subscriber device 102 and the called party's device, and hence only one communication status message is transmitted in response to receipt of termination response message 4f.

Communication status message 4g is transmitted by allocated signaling node 106a in its capacity as serving the called party's device. In embodiments, communication status message 4g comprises a served party indicator, which identifies whether the originating node that sent the communication status message (in this case signaling node 106a) was serving the called party or the calling party. In such embodiments, communication status message 4g comprises a served party indicator which identifies that the called party was being served. Communication status message 4i is transmitted by allocated signaling node 106a in its capacity as serving the subscriber device 102 (i.e. the calling party's device). In embodiments, communication status message 4i comprises a served party indicator, which identifies that the calling party was being served.

In the context of IMS, communication status messages 4g and 4i may comprise STOP messages. In embodiments, communication status messages 4g and 4i each comprise communication status information. The communication status information may comprise an indication of the type of service that was requested, and/or an identifier for the specific communication session. In the context of IMS, the communication status information may indicate that the communication status message is a STOP message. In some embodiments, communication status messages 4g and 4i further comprise an originating node type identifier, associated with allocated signaling node 106a. In the IMS example described above, the originating node type identifier may identify that allocated signaling node 106a performs the function of an S-CSCF, and therefore that the STOP message is associated with an S-CSCF instance.

In response to receipt of communication status message 4g, network node 110 identifies, on the basis of the communication status information comprised therein that the called party was being served by the originating node at the time the message was transmitted. In response to the identifying that communication status message 4g relates to a called party, network node 110 is configured to forward the communication status information comprised therein to charging node 112 in communication status message 4h.

In response to receipt of communication status message 4i, network node 110 identifies, on the basis of the communication status information comprised therein that the calling party (i.e. subscriber device 102) was being served by the originating node at the time the message was transmitted. In response to the identifying that communication status message 4*i* relates to a calling party, network node 110 is configured to generate any further communication status information that may be required for reporting to charging node 112. In the context of IMS for example, as the service request relates to termination of a communication session, and not setup of a communication session, no further status information is required. Therefore, on the basis of the communication status information comprised within one or more of communication status messages 4*g* and 4*i*, network node 110 determines that the communication status messages relate to a service that does not require generation of further communication status information. In embodiments, this determination comprises identifying that the service relates to a communication session that has already been established. In response to determining that generation of further communication status information is not required, network node 110 is configured to forward the communication status information comprised within communication status message 4*i* to charging node 112 in communication status message 4*j*. Having transmitted communication status messages 4*g* and 4*i* to network node 110, allocated signaling node 106*a* is further configured to transmit termination response message 4*k* to edge proxy 104.

In response to receipt of termination response message 4*k*, edge proxy 104 is configured to transmit communication status message 4*l* to charging node 112. In the context of IMS, communication status message 4*l* may comprise a STOP message. In embodiments, communication status message 4*l* comprises communication status information. As described above, communication status information may comprise an indication of the type of service that was requested and/or comprise an identifier for the specific communication session. In the context of IMS, the communication status information may indicate that communication status message 4*l* is a STOP message. In some embodiments, communication status message 4*l* further comprises an originating node type identifier associated with edge proxy 104. In the IMS example described above, the originating node type identifier may identify that edge proxy 104 performs the function of a P-CSCF, and therefore that that STOP message 4*l* is associated with a P-CSCF instance. In response to receipt of termination response message 4*l*, edge proxy 104 is further configured to transmit termination response message 4*m* to subscriber device 102.

Hence, in embodiments, the operation of network node 110 in the context of the proposed telecommunications network 100 serves to ensure that charging node 112 receives a complete set of communication status messages associated with termination of a communication session. In the context of the IMS example described above, this includes two EVENT messages associated with S-CSCF instances and two EVENT messages associated with P-CSCF instances. Hence, it can be seen that network node 110 may be configured to conditionally generate further communication status information in dependence upon the type of service being requested.

During a communication session, charging node 112 may expect to receive a number of interim communication status messages which may be required to be transmitted to charging node 112 to confirm that the communication session is still ongoing. In the embodiments described above, edge proxy 104 and border entity 108 are configured to report communication status messages to charging node 112 directly. There, in embodiments, network node 110 is configured to ensure that charging node 112 receives such interim communication status messages that would be conventionally provided by nodes in telecommunications network other than edge proxy 104 and border entity 108. In the context of IMS for example, during an established communication session, a CDF may expect to receive an INTERIM message from each of an originating P-CSCF, an originating S-CSCF, a terminating S-CSCF and a terminating P-CSCF. In some IMS embodiments, edge proxy 104 and border entity 108 fulfil the role of P-CSCFs in telecommunications network 100. In some such embodiments, edge proxy 104 and border entity 108 are configured to report INTERIM messages during an ongoing communication session to charging node 112 directly. Hence, in such embodiments, network node 110 may be configured to report one or more INTERIM messages to charging node 112 on behalf of S-CSCF instances.

Interim communication status messages may be required to be sent under two different circumstances:

Firstly, in some embodiments, charging node 112 may require interim communication status messages to be sent when a change request is processed in relation to the communication session. The procedure for handling a change request is similar to the process for handling a termination request as described previously in relation to FIG. 4, with the following differences: messages 4*a*, 4*b* and 4*c* represent change request messages rather than termination request messages; and messages 4*f*, 4*k* and 4*m* represent change response messages rather than termination response messages. In the context of IMS for example, communication status messages 4*e* and 4*l* may be INTERIM messages with originating node type identifiers associated with P-CSCF instances, and communication status messages 4*h*, 4*h*, 4*i* and 4*j* may be INTERIM messages with originating node type identifiers associated with S-CSCF instances.

Secondly, in some embodiments, charging node 112 may require interim communication status messages to be sent periodically during the communication session. In such embodiments, interim messages are required to be sent to the charging node 112 at predefined intervals throughout the duration of the communication session. In the embodiments depicted in FIGS. 1 to 4, edge proxy 104 and border entity 108 are configured to report communication status messages to charging node 112 directly. Therefore, in embodiments, network node 110 is configured to ensure that charging node 112 receives the communication status messages that would be conventionally provided by nodes in telecommunications network other than edge proxy 104 and border entity 108. In such embodiments in the context of IMS for example, network node 110 is configured to report one or more INTERIM messages to charging node 112 on behalf of S-CSCF instances. During an established communication session, network node 110 may for example be configured to generate any interim communication status information which may be required for the purposes of reporting to charging node 112. In embodiments, the interim communication status information is generated on the basis of communication status information comprised within one or more previously received communication status message, such as communication status messages 3*g* and 3*i* received during the previously described communication session setup procedure.

In the context of IMS for example, during an established communication session, charging node 102 (fulfilling the role of a CDF) will expect to receive two INTERIM messages associated with P-CSCF instances and two INTERIM messages associated with S-CSCF instances in each time period. In the embodiments described above in relation to one or more of FIGS. 1 to 4, edge proxy 104 and border entity 108 perform the functions of P-CSCFs and are configured to report communication status messages to charging node 112 directly. Therefore, in embodiments network node 110 is configured to generate the interim communication status information expected from the S-SCSF instances. In embodiments, the interim communication status information is generated on the basis of the communication status information received in one or more prior communication status messages. For example, an identifier for the communication session comprised within a prior received communication status information may be included in the generated interim communication status information, to ensure that the generated interim communication status information can be later correlated with other communication status messages/information relating to the same communication session.

In embodiments, network node 110 may comprise a timer function, which can be used to measure the amount of time that has passed since a previous communication status message was transmitted or received. Once the timer has reached a predetermined time value, network node 110 may be configured to transmit one or more interim communication status messages comprising the generated interim communication information. In embodiments, the predetermined time value is defined for compliance with the requirements or expectations of charging node 112. In embodiments, originating node type identifiers for the transmitted interim communication status messages are generated by network node 110. In some embodiments, the originating node type identifier is associated with an S-CSCF instance. In networks in which one or more of the signaling nodes do not remain in the signaling path throughout the duration of a communication session, this enables the expected set of communication status messages to be generated, even if a non-conventional network topology is employed. Further, the requirement for signaling nodes to maintain a record of currently active sessions is avoided, and resilience to loss of a given signaling node is improved.

In some embodiments, the timer is initiated in response to receipt of one or more prior received communication status messages, such as communication status messages 3g and/or 3i received during the previously described communication session setup procedure. In some embodiments, the timer is reset each time the predetermined time value is reached, to ensure that subsequent interim communication status messages are transmitted when the predetermined time next elapses. In such embodiments, network node 110 may generate further communication status information on the basis of the prior received communication status information, for transmitting in the subsequent communication status messages.

It can be seen that generated communication status information may be transmitted by network node 110 either in response to receipt of a given communication status message, or in response to a timer reaching a predetermined time value. In this manner, occurrence of one or more of these conditions may be considered a predetermined trigger event.

In the embodiments described above, the signaling nodes in telecommunications network 100, such as edge proxy 104, signaling nodes 106 and border entity 108, have been shown as generating communications status messages upon receiving a service response message, rather than a service request message. This behavior ensures that subscribers are only billed for services that are delivered. In alternative embodiments, charging node 112 is configured to expect communication status messages to be transmitted by the signaling nodes upon receipt of the service request in addition to, or instead of, upon receipt of the service response. Further, in some embodiments, a message is sent for which no corresponding response is required. In such embodiments, signaling nodes may be configured to identify such messages and transmit communication status messages upon receipt of the service request instead of the response. For example, in the context of SIP, there is no requirement to send a corresponding response in relation to an ACK acknowledgement message. Hence, in some embodiments, one or more of the signaling nodes in telecommunications network 100 is configured to transmit a communication status message in response to receipt of a service request message.

Figure 5:
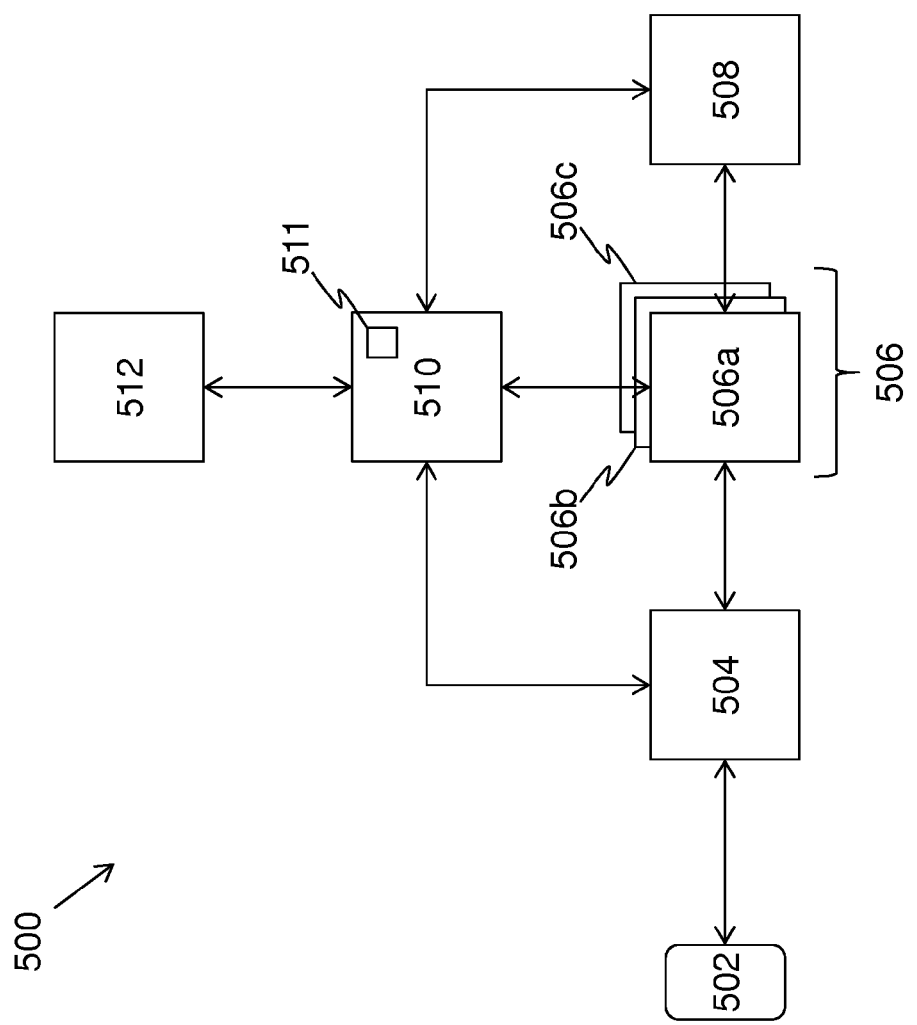
FIG. 5 illustrates an example telecommunications network in which one or more embodiments of the present disclosure may be practiced.

FIG. 5 illustrates an example telecommunications network 500 in which embodiments of the present disclosure may be practiced. In the previously described embodiments, edge proxy 104 and border entity 108 have been configured to transmit communication status messages to charging node 112 directly. In the embodiments illustrated in FIG. 5, edge proxy 504 and border entity 508 are instead configured to transmit communication status messages to network node 510 in a similar manner to the plurality of signaling nodes in cluster 106 as previously described in relation to FIGS. 1 to 4. Subscriber device 502, edge proxy 504, plurality of signaling nodes 506 (including signaling nodes 506a, 506b and 506c), border entity 508, network node 510 and charging node 512 are otherwise similar to the function of the previously described subscriber device 102, edge proxy 104, plurality of signaling nodes 106 (including signaling nodes 106a, 106b and 106c), border entity 108, network node 110 and charging node 112, unless further described below. In the embodiments depicted in FIG. 5, network node 510 is configured to receive communication status messages from edge proxy node 504 and border entity 508. In some embodiments, telecommunications network 500 comprises an IMS network.

Figure 6:
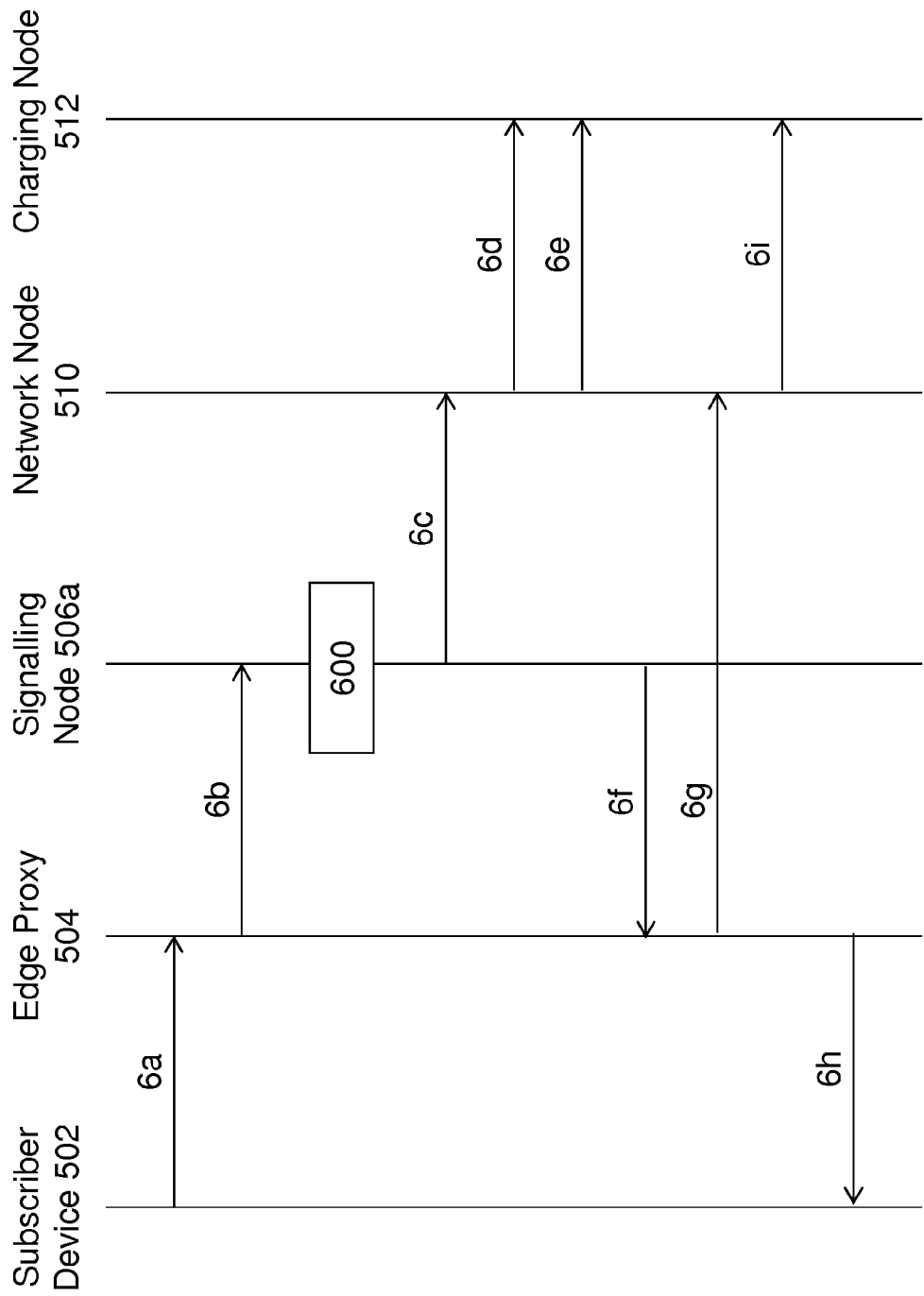
FIG. 6 illustrates an example communication status reporting procedure according to one or more embodiments of the present disclosure.

FIG. 6 illustrates an example communication status reporting procedure for an event based service according to embodiments. In the embodiments depicted in FIG. 6, edge proxy 504 is configured to report communication status messages to network node 510. Therefore, in embodiments, network node 510 is configured to ensure that charging node 512 receives the communication status messages that would be conventionally provided by nodes in telecommunications network, including edge proxy 504. In the context of IMS, for an event based service, a CDF may expect to receive an EVENT message from an S-CSCF and an EVENT message from a P-CSCF for each event based service provided in telecommunications network 500. For some event based services, such as a REGISTER service, a CDF may also expect to receive an EVENT message from an I-CSCF. Hence, network node 510 may be configured to report one or more EVENT messages on behalf of an S-CSCF, a P-CSCF and/or I-CSCF to charging node 512.

Items 6a to 6f and item 6h are equivalent to the previously described items 2a to 2f and item 2h respectively, which were described in relation to FIG. 2. However, in the embodiments depicted in FIG. 6, in response to receipt of service response message 6f, edge proxy 504 is configured to transmit communication status message 6g to network node 510. In the context of IMS for example, communication status message 6g may comprise an EVENT message. In embodiments, communication status message 6g comprises communication status information. As described above, communication status information may comprise an indication of the type of service that was requested and/or comprise an identifier for the specific instance of event based service. In the context of IMS, the communication status information may indicate that communication status message 6g is an EVENT message. In some embodiments, communication status message 6g further comprises an originating node type identifier associated with edge proxy 504. In the IMS example described above, the originating node type identifier may identify that edge proxy 504 performs the function of a P-CSCF, and therefore that that EVENT message 6g is associated with a P-CSCF instance.

Having received communication status message 6g, network node 510 is configured to generate any further communication status information which may be required for reporting to charging node 512. In this case, no further communication status information is required, and therefore network node 110 is configured to forward the communication status information received in communication status message 6g on to charging node 112 in communication status message 6h. In embodiments, the decision as to whether generation of any further communication status information is required may be performed on the basis of communication status information received in communication status message 6g. In some embodiments, the decision as to whether generation of any further communication status information is required is performed on the basis of one or more further received messages and/or data pre-configured in network node 110. In some embodiments, the decision is performed on the basis of the originating node type identifier. For example, in the context of IMS, as communication status message 6g is associated with a P-CSCF instance, network node 110 may determine that the generation of further communication status information is not required. In response to receipt of service response message 6f, edge proxy 104 is further configured to transmit service response message 6h to subscriber device 102.

Hence, in embodiments, the operation of network node 110 in the context of the proposed telecommunications network 100 serves to ensure that charging node 112 receives a complete set of communication status messages associated with the event based service provided.

Figure 7:
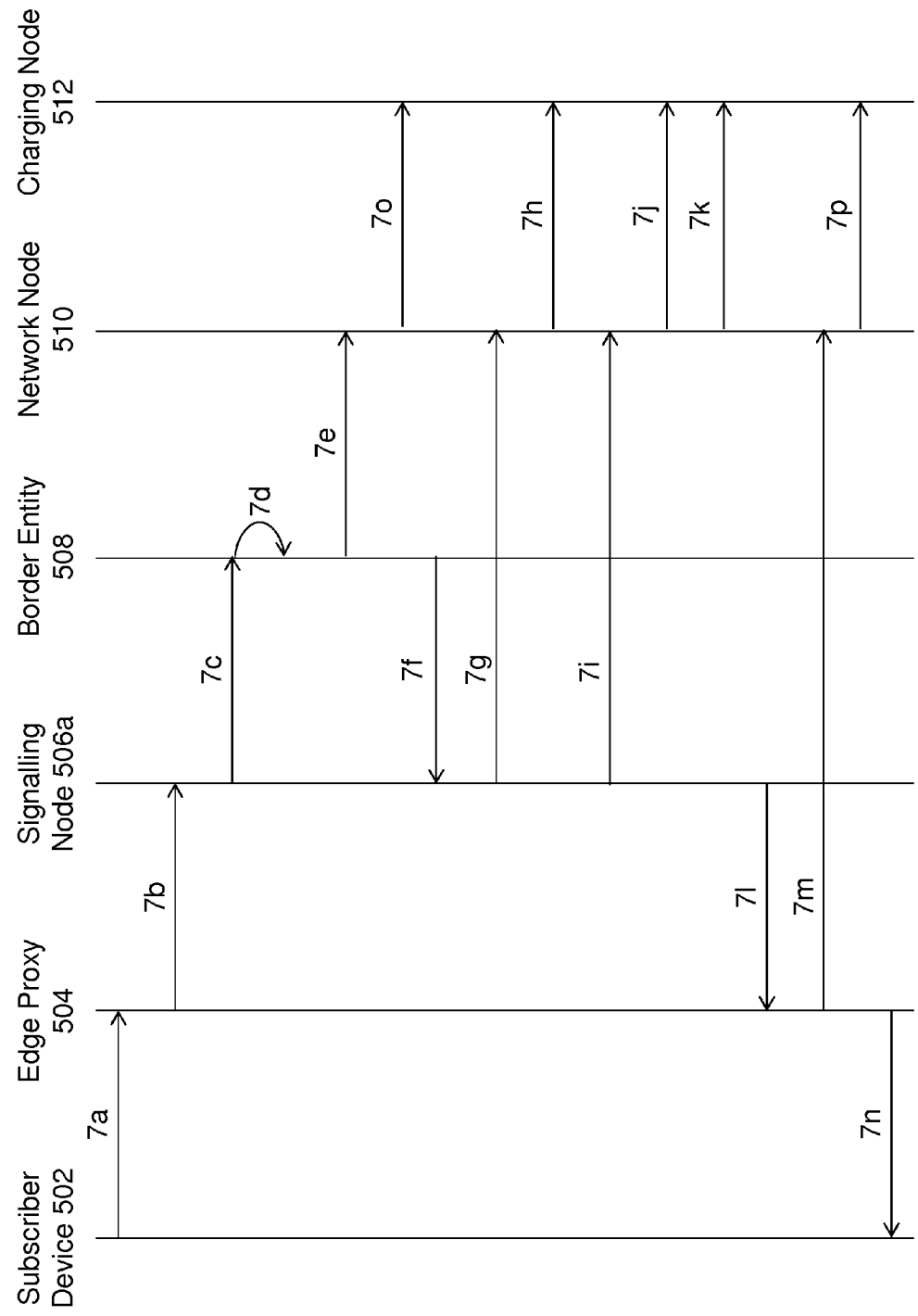
FIG. 7 illustrates an example communication status reporting procedure according to one or more embodiments of the present disclosure.

FIG. 7 illustrates an example communication status reporting procedure for a communication session setup process according to embodiments. In the embodiments depicted in FIG. 7, edge proxy 504 is configured to report communication status messages to network node 510. Therefore, in embodiments, network node 510 is configured to ensure that charging node 512 receives the communication status messages that would be conventionally provided by nodes in a telecommunications network, including edge proxy 504. In the context of IMS, for a communication session setup process, a CDF may expect to receive a START message from each of an originating P-CSCF, an originating S-CSCF, a terminating S-CSCF and a terminating P-CSCF, as well as an EVENT message from an I-CSCF. Hence, network node 510 may be configured to report one or more START and/or EVENT messages on behalf of an S-CSCF, a P-CSCF and/or I-CSCF to charging node 512.

Items 7a to 7d, 7f to 7l and 7n are equivalent to the previously described items 3a to 3d, 3f to 3l and 3n respectively, which were described in relation to FIG. 3. However, in the embodiments depicted in FIG. 5, in response to step 7d, border entity 508 is configured to transmit communication status message 7e to network node 510. Similarly, in response to receipt of service response message 7l, edge proxy 504 is configured to transmit communication status message 7m to network node 510. In response to receipt of each of communication status message 7e and communication status message 7m, network node 510 is configured to forward the communication status information contained therein to charging node 512 in communication status message 7o and communication status message 7p respectively, according to the forwarding process described previously in relation to FIG. 6.

In the embodiments described in relation to FIGS. 5 to 7, network node 510 is responsible for transmitting communication status information associated with further signaling nodes, including edge proxy 504 and border entity 508 to charging node 512. In embodiments, one or more of these further signaling nodes may be configured to not remain in the signaling path after processing a given signaling message. In such embodiments, network node 510 may also be responsible for generating interim communication status information and transmitting a number of interim communication status messages to charging node 512 on behalf of one or more of the further signaling nodes.

In the embodiments described above in relation to FIGS. 5 to 7, edge proxy 504 and border entity 508 are configured to report communication status messages to network node 512. In some embodiments, one or more of edge proxy 504 and border entity 508 may generate and send interim communication status messages to network node 510 during a communication session. In such embodiments, network node 510 may be configured to forward these messages on to charging node 512, as described previously in relation to FIGS. 5 to 7. In alternative embodiments however, one or more of edge proxy 504 and border entity 508 may not generate and send interim communication status messages to network node 510 during a communication session, for example because they do not remain in the signaling path for the given communication session. In such embodiments, network node 510 is configured to ensure that charging node 512 receives such interim communication status messages that would be conventionally provided by edge proxy 504 and border entity 508. In such embodiments, network node 510 may generate communication status information on behalf of one or more of edge proxy 504 and border entity 508 and transmit the generated communication status information to charging node 512 in response to occurrence of one or more of the aforementioned predetermined trigger events. In the context of IMS for example, during an established communication session, network node 510 may be configured to report one or more INTERIM messages associated with one or more P-CSCF instances to charging node 112 in addition to transmission of the previously described INTERIM messages associated with one or more S-CSCF instances.

It will be seen by extension how the remainder of the procedures carried out by embodiments described previously in relation to telecommunications network 100 in relation to FIGS. 1 to 4 may be carried out in telecommunications network 500, for example by routing communication status reporting messages from edge proxy 504 and border entity 508 to charging node 512 via network node 110, and/or by generating communication status information on behalf of edge proxy 504 and border entity 508 and transmitting this to charging node 512.

In some embodiments, one or more of edge proxy 104, 504 and border entity 108, 508 are configured to remain in the signaling path during a communication session, whilst the plurality of signaling nodes 106, 506 are configured not to remain in the signaling path during the communication session. In such embodiments, network node 110, 510 may be configured to generate interim communication status information and transmit the generated communication status information to charging node 112, 512 in interim communication status messages in response to receipt of interim communication status messages received from a signaling node in the plurality of signaling nodes 106, 506.

In some embodiments, one of edge proxy 104, 504 and border entity 108, 508 may be configured to transmit communication status messages directly to charging node 112, 512, as described previously in relation to FIGS. 1 to 4, while the other of edge proxy 104, 504 and border entity 108, 508 may be configured to transmit communication status messages to network node 110, 510, as described previously in relation to FIGS. 5 to 7. In such embodiments, network node 110, 510 may responsible for transmitting communications status messages on behalf of only one of edge proxy 104, 504 and border entity 108, 508 (i.e. whichever is configured to transmit communication status messages to network node 110, 510).

In some embodiments, one or more of edge proxy 104, 504 and border entity 108, 508 may be configured to transmit communication status messages directly to charging node 112, 512, as well as to network node 110, 510. In such embodiments, network node 110, 510 may be pre-configured with information regarding the nodes for which it is responsible for transmitting communications status messages to charging node 112, 512. In further embodiments, the nodes for which network node 110, 510 is responsible for transmitting communications status messages to charging node 112, 512 may be configured to include a responsibility indicator in the communication status messages sent to network node 110, 510. The responsibility indicator indicates to network node 110, 510 whether network node 110, 510 is responsible for transmitting associated communications status messages to charging node 112, 512. In such embodiments, the generation of communication status information by network node 110, 510 is conditionally performed on the basis of the responsibility indicator comprised within the received communication status message. In embodiments, the responsibility indicator is comprised within the received communication status information.

In the previously described embodiments, network node 110, 510 has been described as transmitting communication status information in independent communication status messages, for example as required if interfacing with a charging node 112, 512 comprising an IMS CDF via an Rf interface. In alternative embodiments, network node 110, 510 may instead store the communication status information that it generates or intends to forward in a data store (not shown), accessible to network node 110, 510, until more communication status information associated with the corresponding communication session or event based service has been collected. In some such embodiments, the communication status information is stored until such time as all communication status information associated with the corresponding communication session or event based service has been collected. In embodiments, at such a time, network node 110, 510 is configured to collate all of the communication status information associated with the corresponding communication session or event based service into a single, collated communication status message and transmit the collated communication status information to charging node 112, 512. In embodiments, the collated communication status message comprises a call detail record (CDR). Such behaviour enables network node 110, 510 to interfacing directly with a charging node 112, 512 comprising an IMS Charging Gateway Function (CGF), thereby subsuming the function of the CDF into network node 110, 510. In some such embodiments, network node 110, 510 communicates with charging node 112, 512 via an IMS Ga interface. In further embodiments, the collated communication status information is transmitted to charging node 112, 512 comprising IMS Billing Domain (BD), thereby further subsuming the function of the CGF into network node 110, 510. In some such embodiments, network node 110, 510 communicates with charging node 112, 512 via an IMS Bi or Bp interface. In some such embodiments, the collated communication status information is transmitted to charging node 112, 512 in response to a request received from charging node 112, 512. In further embodiments, network node 110, 510 may determine that charging node 112, 512 has become unavailable, and in response to this determination network node 110, 510 may be configured to store communication status information that would otherwise have been transmitted to charging node 112, 512 until such time as charging node 112, 512 becomes available again.

In embodiments, network node 110, 510 comprises a plurality of network nodes. In some such embodiments, network node 110, 510 comprises a set of distributed network nodes. In some embodiments, network node 110, 510 comprises a cluster of network nodes. In such embodiments, the plurality of network nodes 110, 510 may comprise a shared data store accessible to each of the network nodes in the plurality. In embodiments, the shared data store is used by the plurality of network nodes 110, 510 for storing session state, such as one or more session identifiers, timer values, and/or communication status information. In some such embodiments, the shared data store is distributed across the plurality of network nodes. In embodiments, the shared data store comprises a Memcached™ data store. In embodiments, the shared data store comprises a key-value data store, for example Apache Cassandra™. In embodiments, the plurality of network nodes 110, 510 may comprise a number of systems, either real physical systems or virtual machines, such as those comprised within a virtualized data centre or public or private cloud. In this way the system can scale horizontally to support a large number of users. In embodiments, a communication status message transmitted to network node 110, 510 may be allocated to any network node in the plurality. In some such embodiments, the choice of network node is made randomly. In further embodiments, the choice of network node is made according to one or more load balancing criteria in order to distribute network load across the plurality of network nodes 110, 510.

In some embodiments, signaling nodes in the network, other than the plurality of signaling nodes 106, 506, may also or alternatively be clustered, such as edge proxy 104, 504 and border entity 108, 508. The present disclosure is not limited to operating with clustered signaling nodes 106, 506. In further embodiments, network node 110, 510 is configured to receive communication status messages from one or more un-clustered signaling nodes.

In some embodiments, charging node 112, 512 comprises a plurality of charging nodes. In some such embodiments, charging node 112, 512 comprises a set of distributed charging nodes. In some embodiments, charging node 112, 512 comprises a cluster of charging nodes. In such embodiments, a fallback charging node in the plurality may be defined, should a given charging node in the plurality become unavailable. In some such embodiments, network node 110, 510 is configured to transmit communication status information for transmission to the given charging node to the fallback charging node instead.

In embodiments, network node 110, 510 comprises a processor or processing system, as depicted by processor 111, 511 in FIG. 1 and FIG. 5 respectively. In embodiments, the processing system comprises one or more processors and/or memory. Each network node/entity as described in relation to any of the embodiments described above may similarly comprise a processor and/or processing system. One or more of the aspects of the embodiments described herein with reference to the drawings comprise processes performed by network node 110, 510. In embodiments, the network node 110, 510 comprises one or more processing systems or processors configured to carry out these processes. In this regard, embodiments may be implemented at least in part by computer software stored in (non-transitory) memory and executable by the processor, or by hardware, or by a combination of tangibly stored software and hardware (and tangibly stored firmware). Embodiments also extend to computer programs, particularly computer programs on or in a carrier, adapted for putting the above described embodiments into practice. The program may be in the form of non-transitory source code, object code, or in any other non-transitory form suitable for use in the implementation of processes according to embodiments. The carrier may be any entity or device capable of carrying the program, such as a RAM, a ROM, or an optical memory device; etc.

The above embodiments are to be understood as illustrative examples. Further embodiments are envisaged. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of embodiments, which is defined in the accompanying claims.

What is claimed is:

1. A method for processing communication status messages in a telecommunications network, the method comprising:
   at a network node, receiving a communication status message from a signaling node, wherein the signaling node is one of a plurality of signaling nodes responsible for processing signaling information in the telecommunication network, and wherein the received communication status message comprises first communication status information;
   at the network node, generating second communication status information based on at least the first communication status information, the first communication status information being different from the second communication status information; and
   at the network node, transmitting two or more communication status messages to a charging node, wherein the two or more transmitted communication status messages comprise the first communication status information and the second communication status information, and wherein the charging node is responsible for processing billing information in the telecommunication network in order to monitor at least one of establishment and duration of communication sessions, and occurrence of event based services.

2. The method of claim 1, wherein the first communication status information and the second communication status information each comprise a partial call record.

3. The method of claim 1, wherein at least one of the one or more transmitted communication status messages are transmitted in response to occurrence of a predetermined trigger event.

4. The method of claim 3, wherein the predetermined trigger event comprises receipt of the received communication status message from the signaling node in the plurality.

5. The method of claim 3, comprising initiating a timer in response to receipt of the received communication status message, wherein the predetermined trigger event comprises the timer reaching a predetermined time value.

6. The method of claim 5, comprising resetting the timer in response to occurrence of the predetermined trigger event.

7. The method of claim 6, comprising, in response to occurrence of a subsequent predetermined trigger event, generating third communication status information on the basis of at least the first communication status information, wherein the one or more transmitted communication status messages comprise the third communication status information.

8. The method of claim 1, wherein the first communication status information comprises a first originating node type identifier, and the second communication status information comprises a second originating node type identifier, wherein the first originating node type identifier is different to the second originating node type identifier.

9. The method of claim 8, wherein the first originating node type identifier is associated with the signaling node in the plurality.

10. The method of claim 8, wherein the second originating node type identifier is not associated with a signaling node in the plurality.

11. The method of claim 8, comprising generating the second originating node type identifier.

12. The method of claim 11, wherein each said originating node type identifier identifies an interrogating call session control function (I-CSCF), a proxy call session control function (P-CSCF) or a serving call session control function (S-CSCF).

13. The method of claim 1, wherein the first communication status information comprises a session identifier associated with the received communication status message, and wherein the generated second communication status information comprises the session identifier.

14. The method of claim 1, wherein the first communication status information comprises an event instance identifier associated with the received communication status message, and wherein the generated second communication status information comprises the event instance identifier.

15. The method of claim 1, wherein the one or more transmitted communication status messages comprise a first transmitted communication status message and a second transmitted communication status message, the first transmitted communication status message comprising the first communication status information and the second transmitted communication status message comprising the second communication status information.

16. The method of claim 15, wherein at least one of the one or more transmitted communication status messages comprises an IMS accounting request (ACR).

17. The method of claim 16, wherein each said ACR comprises a START, EVENT, INTERIM or STOP message.

18. The method of claim 1, wherein the charging node comprises a charging data function (CDF).

19. The method of claim 1, wherein the one or more transmitted communication status messages are transmitted via an IMS Rf interface.

20. The method of claim 1, wherein the one or more transmitted communication status messages comprise a collated communication status message, the collated communication status message comprising the first communication status information and the second communication status information.

21. The method of claim 20, wherein the collated communication status message comprises a call detail record (CDR) comprising the first communication status information and the second communication status information.

22. The method of claim 20, wherein the charging node comprises a charging gateway function (CGF).

23. The method of claim 22, wherein the one or more transmitted communication status messages are transmitted via an IMS Ga interface.

24. The method of claim 20, wherein the charging node comprises an IMS billing system (BS).

25. The method of claim 24, wherein the one or more transmitted communication status messages are transmitted via one or more of an IMS Bi or Bp interface.

26. The method of claim 1, comprising receiving a further communication status message from a further signaling node in the plurality, the further communication status message comprising further communication status information, wherein the second communication status information is generated further on the basis of the further communication status information.

27. The method of claim 1, wherein the signaling node in the plurality comprises one or more of an interrogating call session control function (I-CSCF), a proxy call session control function (P-CSCF) and a serving call session control function (S-CSCF).

28. The method of claim 1, wherein the received communication status message comprises an accounting request (ACR).

29. The method of claim 28, wherein each said ACR comprises a START, EVENT, INTERIM or STOP message.

30. The method of claim 1, wherein the telecommunications network comprises an Internet Protocol Multimedia Subsystem (IMS) network.

31. The method of claim 1, wherein the network node comprises a network node in the telecommunications network configured to communicate with the charging node and one or more of the plurality of signaling nodes, including at least the signaling node.

32. The method of claim 31, wherein the network node comprises one of a plurality of network nodes in telecommunications network, wherein the plurality of network nodes are arranged in a cluster.

33. The method of claim 32, wherein each network node in the plurality of network nodes is configured to access a shared data store.

34. The method of claim 1, wherein each said communication status message is associated with one or more of a communication session and an event based service.

35. A system for processing communication status messages in a telecommunications network the system comprising:
at least one memory including computer program code;
at least one processor in data communication with the memory, the processor configured to:
at a network node, receive a communication status message from a signaling node, wherein the signaling node is one of a plurality of signaling nodes responsible for processing signaling information in the telecommunication network, and wherein the received communication status message comprising first communication status information;
at the network node, generate second communication status information based on at least the first communication status information, the first communication status information being different from the second communication status information; and
at the network node, transmit two or more communication status messages to a charging node, wherein the two or more transmitted communication status messages comprise the first communication status information and the second communication status information, and wherein the charging node is responsible for processing billing information in the telecommunication network in order to monitor at least one of establishment and duration of communication sessions, and occurrence of event based services.

36. A non-transitory computer-readable storage medium comprising computer-executable instructions, which, when executed by a processor, cause a computerized device to perform a method for processing communication status messages in a telecommunications network, the method comprising:
at a network node, receiving a communication status message from a signaling node, wherein the signaling node is one of a plurality of signaling nodes responsible for processing signaling information in the telecommunication network, and wherein the received communication status message comprising first communication status information;
at the network node, generating second communication status information based on at least the first communication status information, the first communication status information being different from the second communication status information; and
at the network node, transmitting two or more communication status messages to a charging node, wherein the two or more transmitted communication status messages comprise the first communication status information and the second communication status information, and wherein the charging node is responsible for processing billing information in the telecommunication network in order to monitor at least one of establishment, and duration of communication sessions and occurrence of event based services.

* * * * *